(12) United States Patent
Schwarz

(10) Patent No.: US 6,216,688 B1
(45) Date of Patent: Apr. 17, 2001

(54) METHOD FOR TRANSPARENT HEAT INSULATION IN BUILDING

(76) Inventor: Dietrich Schwarz, Via Valundis 8, CH-7013 Domat/Ems (CH)

( * ) Notice: Subject to any disclaimer, the term of this patent is extended or adjusted under 35 U.S.C. 154(b) by 0 days.

(21) Appl. No.: 09/423,432

(22) PCT Filed: Apr. 15, 1998

(86) PCT No.: PCT/CH98/00141
§ 371 Date: Nov. 9, 1999
§ 102(e) Date: Nov. 9, 1999

(87) PCT Pub. No.: WO98/51973
PCT Pub. Date: Nov. 19, 1998

(30) Foreign Application Priority Data

May 9, 1997 (CH) .................................................. 1091/97

(51) Int. Cl.⁷ .................................................. F24J 2/40
(52) U.S. Cl. .......................... 126/633; 126/678; 52/171.3
(58) Field of Search .................................. 126/678, 633, 126/643, 655, 704; 52/171.3

(56) References Cited

U.S. PATENT DOCUMENTS

| | | | |
|---|---|---|---|
| 4,210,128 | * | 7/1980 | Mattson ................................ 126/678 |
| 4,257,398 | * | 3/1981 | Watson ................................ 126/643 |
| 4,380,994 | | 4/1983 | Seemann . |
| 4,739,748 | | 4/1988 | Stice . |
| 4,993,235 | * | 2/1991 | Frantl ................................ 62/235.1 |

FOREIGN PATENT DOCUMENTS

| | | |
|---|---|---|
| 25 06 332 | 8/1976 | (DE) . |
| 2749182 * | 6/1981 | (DE) ................................ 126/633 |
| 0 075 464 | 3/1983 | (EP) . |
| 0 346 320 | 12/1989 | (EP) . |
| 2 280 503 | 2/1995 | (GB) . |
| 56-68734 * | 6/1981 | (JP) ................................ 126/633 |
| WO 95/22886 | 8/1995 | (WO) . |

* cited by examiner

Primary Examiner—Ira S. Lazarus
Assistant Examiner—Sara Clarke
(74) Attorney, Agent, or Firm—Browdy & Neimark

(57) ABSTRACT

The facade unit (1) has three plate sections (2, 3, 4). The intermediate space (5) facing the building interior is filled with gas, the exterior intermediate space (6) being filled with a circulating liquid (7) which is dyed or pigmented in such a way that it absorbs infrared light but is at least partially transparent for visible light. This ensures that the building interior is well shaded from heat radiation and provides and efficient means of acquiring heat energy. The efficiency can be increased further by various methods.

8 Claims, 4 Drawing Sheets

Figure 4:
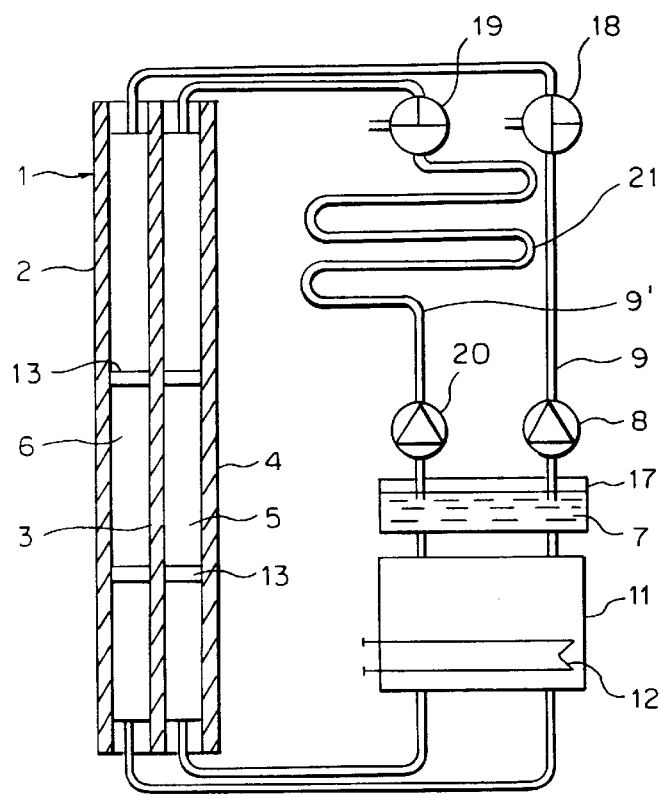

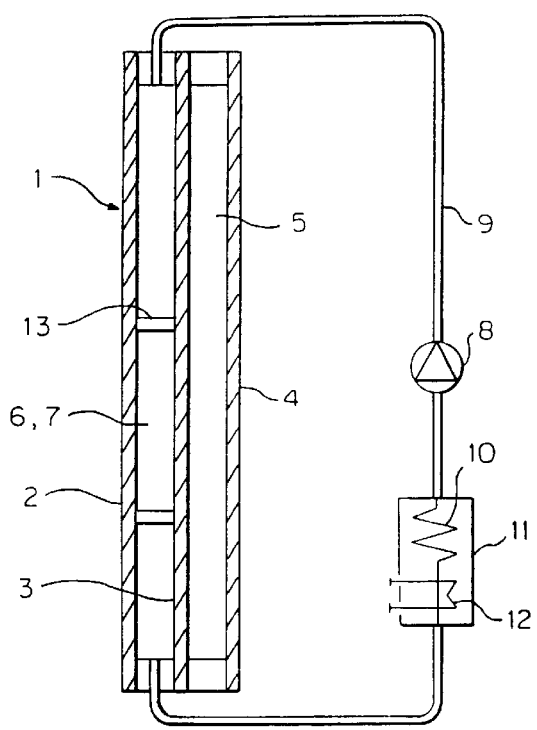
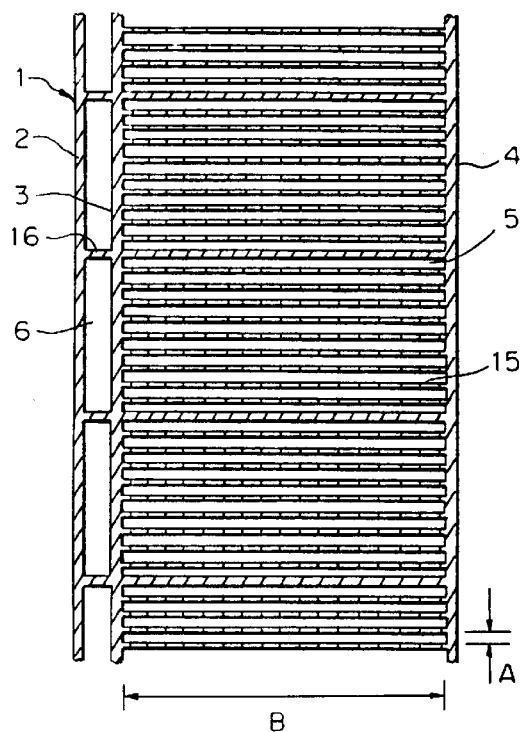
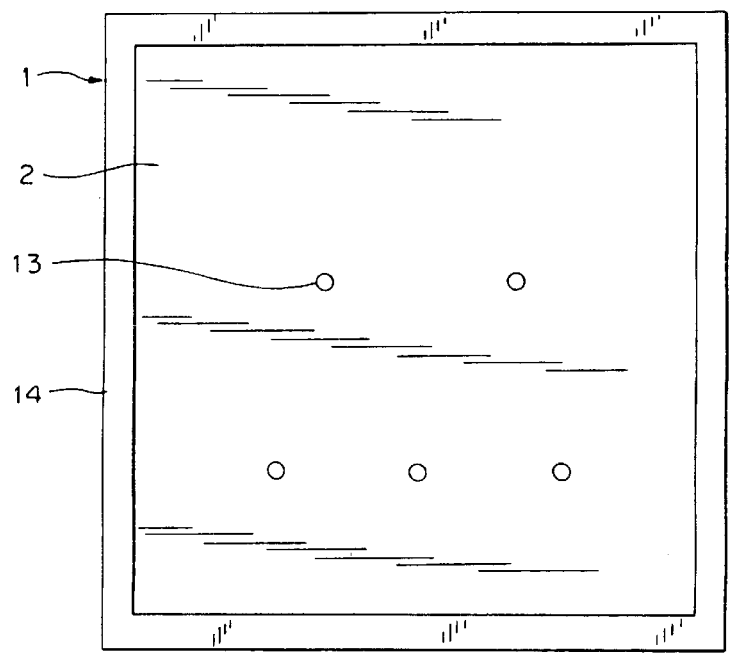

METHOD FOR TRANSPARENT HEAT INSULATION IN BUILDING

CROSS REFERENCE TO RELATED APPLICATION

The present application is the national stage under 35 U.S.C. 371 of PCT/CH98/00141, filed Apr. 15, 1998.

BACKGROUND OF THE INVENTION

1. Technical Field of the Invention

The present invention relates to a device for transparent heat insulation in a building.

2. Prior Art

A device of this type is known from EP-B-75 464. It includes a transparent web plate in which a liquid flows through the intermediate spaces. The liquid absorbs infrared light. The incident sunlight warms the liquid, and it can be used to heat the building, or provide shade in the summer. In one embodiment, a pane of glass is mounted on the outside of the web plate.

A further transparent, insulating web plate is described in WO 95/22886.

EP-A-346 320 discloses further transparent thermal insulators. One embodiment involves the arrangement of four parallel, transparent plates. During winter operation, a liquid flows through the intermediate space on the outside of the building. The liquid is supplied at a temperature below the ambient temperature. The ambient air heats the liquid slightly via the outer plate. Disposed in the circuit of the circulating heating liquid is a heat pump that re-cools the liquid to the entrance temperature. The heat pump is used to bring the obtained thermal energy to a higher temperature level. In the summer, the innermost intermediate space is acted upon by the liquid at a temperature below the internal temperature of the building. The liquid therefore always circulates in the intermediate space located on the cooler side. The heat transfer to the liquid is effected through heat conduction and convection. This heat insulation, however, stipulates a relatively high energy requirement for the heat pump.

U.S. Pat. No. 4,380,994 discloses a further heat insulation, which includes three plates. In the summer, the outer intermediate space is filled with a liquid. The liquid is static, and does not circulate. In contrast, in the winter the inner intermediate space is filled with the liquid.

OBJECT OF THE INVENTION

It is the object of the present invention to modify a device for external building insulation of the type mentioned at the outset such that the energy consumption inside the building can be better controlled and, at the same time, the incident solar energy can be better utilized.

BRIEF DESCRIPTION OF THE INVENTION

Embodiments of the invention are described below with reference to the drawings, which show in:

FIGS. 1 and 2 a first embodiment; and

FIGS. 3–9 seven further embodiments.

DETAILED DESCRIPTION OF THE PREFERRED EMBODIMENT(S) OF THE INVENTION

FIG. 1 shows a schematic cross-section through a facade element 1. It includes three parallel, transparent plates 2, 3, 4 comprising, for example, glass (triple-glazing). The plate 4 faces the interior of the building. The intermediate space 5 between the plates 3, 4 is filled with air or a different, better-insulating gas, and serves in heat insulation. The intermediate space 6 between the outer plate 2 and the center plate 3 is filled with a dyed or pigmented liquid 7. The selected dyeing or pigmentation allows light to pass through the liquid 7 practically unimpeded, but causes infrared light to be absorbed to the greatest possible extent. It is also possible, however, to attain a corresponding shading of the building interior through a more intense pigmentation and absorption of a portion of the visible light.

The liquid 7 in the intermediate space 6 circulates by means of a pump 8 and a ring circuit 9 that adjoins the intermediate space 6 at two oppositely-located sides. The heated liquid 7 can be conducted, for example, through a heat exchanger 10 of a hot-water tank 11. The tank 11 can have, for example, an auxiliary electrical heater 12. As an alternative, a floor-heating system, for example, can be supplied with the circuit 9. The heat of the liquid 7 can also be raised to a higher temperature level by a heat pump. The liquid 7 is dyed to varying degrees of darkness through a variation in the pigmentation or dyeing. This permits a variable light absorption of the liquid 7. The building interior behind the liquid can be variably shaded, despite the very good transparency of the liquid. The absorbed energy, in the form of heat, cannot enter the building interior uncontrolled because of the transparent insulation layer. If needed, however, this energy can be utilized. If the thermal energy is not utilized, the pump 8 is shut off. The liquid then serves only in light absorption or the absorption of infrared radiation.

As the height of the facade element increases, so does the water pressure. In web plates, this is not problematic, because the webs lend the element the necessary stability. In this connection, for insulating glazings, the strength of the glass is significant; a hardened glass, particularly a chemically-hardened glass, is of advantage. This means that, in a glass window having dimensions of 1 m×1 m, a glass thickness of 6 mm suffices to trap the water pressure without additional, static measures. In floor-to-ceiling windows, the necessary glass thickness would be too large without static measures. This can be avoided by adding static tensile connections 13 from plate to plate. These tensile connections 13 can be linear or point-wise. More of these connections 13 are required in the lower part of the window, where the water column is the highest, than in the center part. In the upper part—at eye level—connections 13 can be omitted entirely, which enhances viewing. FIG. 2 shows a possible distribution of these tensile connections 13 in a floor-to-ceiling window having a window frame 14. The tensile connections 13 can comprise glass, and be glued to the plates 2, 3.

In the embodiments described below, analogous parts are provided with the same reference characters, so a detailed description of these parts is unnecessary.

FIG. 3 shows a second embodiment. The facade element 1 is embodied here as a web plate, which can be extruded from plastic. The first intermediate space 5 is significantly wider, and is divided into a plurality of webs 15 extending horizontally in the longitudinal direction. The width B of the webs 15 is considerably (at least four times) larger than the spacing A between adjacent webs 15. Because of the different functions, the webs 15, 16 between the plates are shaped and arranged differently. In the plate intermediate space 6 on the outside of the building, the webs 16 are narrow, thick and spaced far apart. This attains the necessary stability of the web plate, so the liquid 7 can flow well through the hollow spaces 6. In the plate intermediate space 5 on the inside of the building, the webs 15 are wide, thin and spaced close together. This attains the necessary insulating effect of the web plate, thereby suppressing the convection in the hollow spaces, as described in WO 95/22886.

The above-described layered construction is ideal for shading. The range of application encompasses large-surface, transparent facades, such as office buildings and low-energy buildings. If the energy consumption is to be reinforced in addition to the shading to achieve a zero-heating building, the above-described design must be expanded. There are several options for doing this.

FIG. 4 illustrates one possibility. The two intermediate spaces 5, 6 are connected to a ring circuit 9, 9, respectively. A small tank 17 stores the liquid 7. The level of the liquid in the tank 17 is below the lower edge of the facade element 1, unlike in the representation in FIG. 1. Disposed in the ring circuits 9, 9' are three-way valves 18, 19, which selectively permit the circulation of the liquid 7 through one of the circuits 9, 9', or the aeration of the upper end of the intermediate spaces 5, 6. As shading or a reduction in the penetration of infrared light is needed, the outer intermediate space 6 is filled with the pigmented liquid 7, and the inner space 5 is filled with air. The pump 8 is in operation, and the valves 18, 19 are in the illustrated position. When building heating is required, the liquid is allowed to flow from the outer layer into the inner layer. For this purpose, the valves 18, 19 are reversed, so the liquid 7 exits the intermediate space 6. The pump 8 is shut off, and the pump 20 is turned on. Consequently, the light in the intermediate space 5 is absorbed and the inner plate 4 is heated to the temperature of the liquid 7, thereby directly heating the building interior. In addition, a floor-heating system 21, for example, can be supplied with the ring circuit 1.

Figure 5:
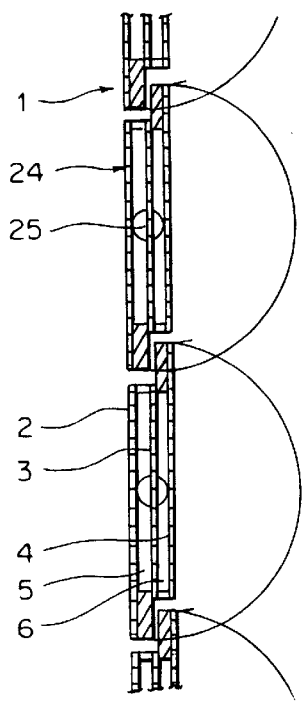

FIG. 5 shows a further, related option. In this case, the transparent or translucent facade element 1 is divided into a plurality of segments 24, which can pivot by 180° about horizontal or vertical axes 25. Thus, as needed, the layer filled with absorbent liquid is the one on the outside for shading the building, or the inside one for heating the building.

Figure 6:
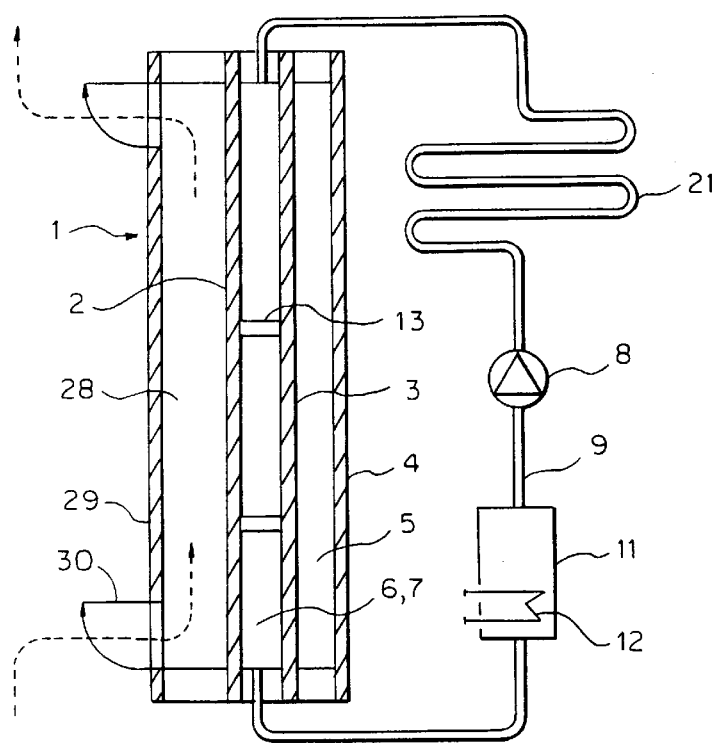
Figure 7:
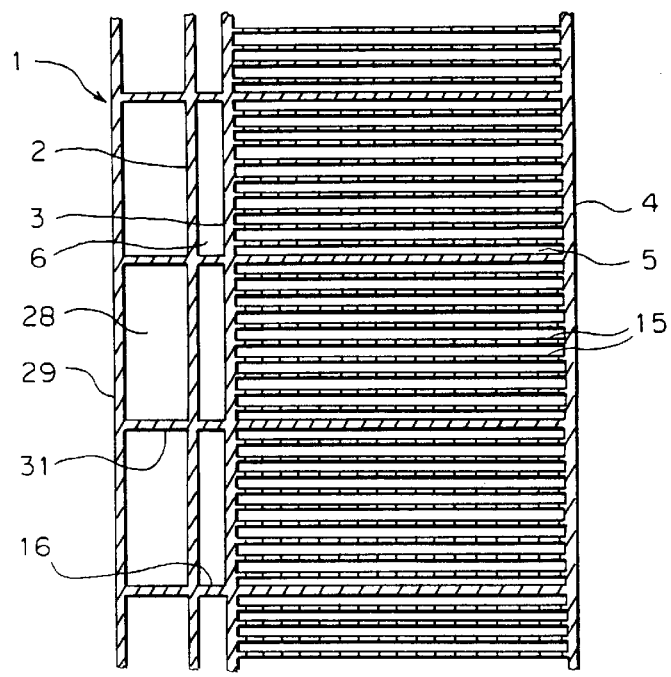

FIG. 6 shows a further option: A further transparent, insulating layer with an intermediate space 6 and an additional plate 29 is mounted in front of the intermediate space 6 filled with the liquid 7 on the building exterior. Thus, two transparent insulating layers are formed, with an intermediate layer 6 that is filled with the liquid 7. This increases the energy gain in the liquid 7, because the transmission loss to the outside is reduced. During the seasons in which heating is not needed, the transmission of the thermal energy in the liquid must be far greater to the outside than to the inside. The insulating layer 28, 29 at the building exterior must either have a variable k value, or this value must be much larger than that of the insulating layer 5 in the building interior.

For the design of the insulating glazing, this means that the triple-glazing is expanded to a quadruple-glazing. Three plate intermediate spaces 5, 6, 28 are formed. The center space 6 is filled with the circulating liquid 7. To make the k value of the plate intermediate space 5 in the building interior far better than the value at the building exterior, the inner space must be filled with an inert gas such as xenon, and the outer space need only be filled with air.

The k value of the outer plate intermediate space 28 can be changed by ventilation flaps 30, which permit a regulated circulation of the air of the outer plate intermediate space 28 with the outside air. If the liquid 7 must be heated, the ventilation flaps 30 remain closed. The air circulation is prevented, and a good k value results in the outer plate intermediate space 28, which improves the efficiency of the energy gain through light absorption in the liquid 7 and, at the same time, improves the k value of the entire plate design tremendously. If the liquid 7 must be cooled, the ventilation flaps 30 are opened. The outside air circulating through the outer plate intermediate space 28 continuously cools the liquid 7 standing in the intermediate space 6. The pump 8 is shut off.

For the design of web plates (FIG. 7), this means that the triple-web plate is expanded to a quadruple-web plate. Three plate intermediate spaces 5, 6, 28 are formed. The inner plate intermediate space 5, having wide, thin webs 15, serves to insulate. The center plate intermediate space 6 is filled with the circulating, pigmented or dyed liquid 7, and serves in light or infrared absorption. The outer intermediate space 28 serves in insulating the liquid 7 to the outside. The webs 31 in the intermediate space 28 are not optimized in terms of insulation, so the k value of the inner intermediate space 5 is much better than the k value of the outer space 28. Ventilation flaps 30 in the outer plate intermediate space 28 permit the circulation of air in this space, and therefore a variable k value.

Figure 8:
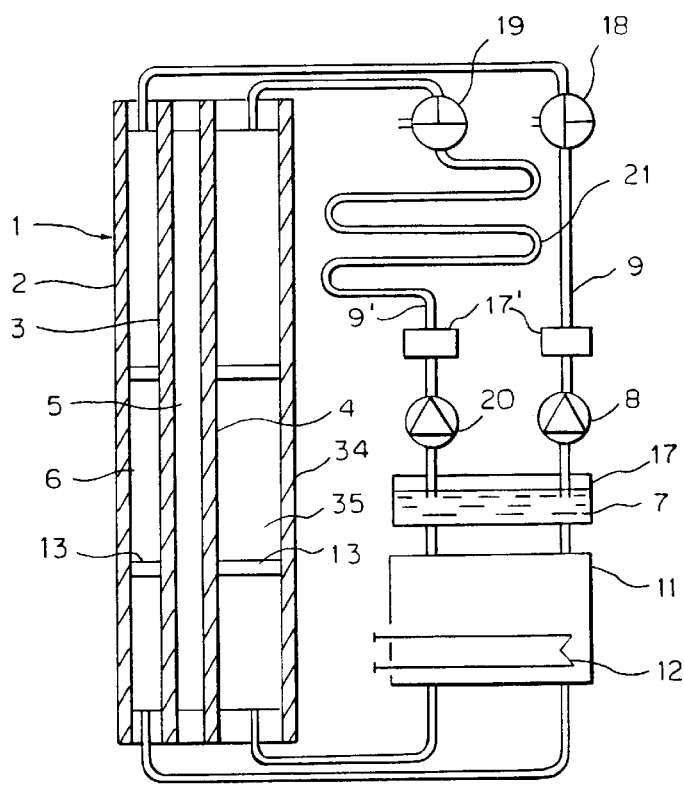
Figure 9:
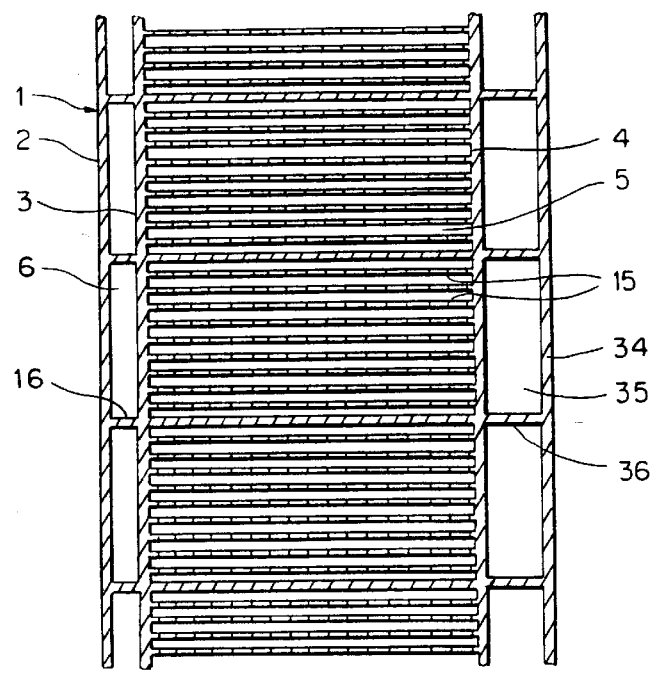

A further option is illustrated in FIGS. 8 and 9. In the building interior, a second, liquid-filled layer having a fourth plate 34 and an intermediate space 35 is mounted in front of the transparent insulating layer 5. Two liquid-filled layers having an interposed transparent insulating layer are formed. The outer liquid-filled layer 6 serves primarily in shading the entire layer structure through light absorption, as well as in obtaining thermal energy. The insulating layer behind this layer ensures that the absorbed energy in the liquid does not enter the building interior uncontrolled. The efficiency is very high, because the transparent insulating layer is mounted in front of the inner layer. The thermal energy is conducted further to a desired location through the circulation of the liquid 7 of the inner layer. The pigmentation or dyeing of the liquid determines its degree of absorption.

If a need exists for thermal energy, despite the fact that the layer structure is shaded, the circulation of the liquid of the outer layer permits the need to be met at a desired location. If light is absorbed in the inner liquid-filled layer 35, the layer is pigmented or dyed, and the outer liquid-filled layer is not pigmented, and is clear. If light is absorbed in the outer layer, the pigmentation or dyeing is exactly reversed. The exact matching of the pigmentation of the two liquid-filled layers allows the desired functions between the gain of thermal energy and shading to be controlled precisely.

Of course, this system can also be used to supply energy to the building as needed. An additional heating system can be omitted. The instantaneous incident solar energy and meteorological data supply the system control with the necessary parameters. A plurality of small tanks 17 holding differently-pigmented liquid can be provided, the tanks being selectively connected to the circuits 9, 9' by way of valves, or separate pigmentation devices 17' can be provided in the circuits 9, 9'.

As an alternative, the liquid 7 can be emptied from the outer intermediate space 6 or the inner intermediate space 35, as in the embodiment according to FIG. 3.

As mentioned above, the inner intermediate space 35 serves in obtaining thermal energy. The circulation speed is relatively high. The temperatures in the space are at a low temperature level of about 20° C. The outer intermediate space 6 serves in shading. The liquid 7 circulates relatively slowly or not at all. The insulating layer 5 separates the intermediate space 6 from the building interior. A high temperature of about 60° C. can dominate in this space at average external temperatures. These temperatures can be utilized ideally for hot service water, which is the primary thermal-energy requirement in transition seasons and in summer. During this time, there is also a great need for shade. To better attain these different temperature levels, it is advantageous for the outer intermediate space 6 to be thinner than the inner space. Thus, less mass need be heated. It reacts faster to heating. At the same time, an ideal sound insulation is achieved. With the liquid, a mass is present that poorly conducts sound waves due to the different thicknesses of the inner and outer layers. In this system design, a further tank mass in the facade can be omitted. This means that the system design is also complete without the additional, inside storage walls. The effective region is far larger. This design can also be used in lightweight constructions, truss constructions and for reconstructing solid masonry having a poor storage capacity, such as brick or wood.

For the design of the insulating glazing (FIG. 8), this means that in the quadruple-glazing, the outer plate intermediate space 6 and the inner plate intermediate space 35 are filled with liquid 7, and the center plate intermediate space is filled with an inert gas possessing good insulating properties.

For the design of the web plate (FIG. 9), this means that narrow, thick and widely-spaced webs 16, 36 are disposed in the inner plate intermediate space 6 and the outer plate intermediate space 35, so the liquid can circulate well between them and the web plate attains the necessary stability. Wide, thin webs 15 having a small spacing are disposed in the center plate intermediate space 5, thus ensuring the necessary insulation. A further advantage is the relatively low temperatures of the light-absorbing, circulating liquids. The web-plate material, predominantly plastic, is therefore less stressed than in thin, solid absorbers, in which very high temperatures occur.

What is claimed is:

1. A device adapted for transparent heat insulation in a building, encompassing a façade element (1) having four parallel, transparent or translucent plates (2, 3, 4, 34) that limit a first intermediate space (5), a second intermediate space (6) adapted to face an exterior of the building, and a third intermediate space (35) adapted to face an interior of the building, with the first intermediate space (5) being filled with gas and the second and third intermediate spaces (6, 35) being connected to at least one liquid circuit (9, 9') with at least one circulation pump (8, 20) such that a light-absorbing liquid (7) selectively flows through at least one of the second or third intermediate spaces (6, 35), the device further including a control device actuated by a high external temperature and solar radiation to circulate the liquid (7) at least in the second intermediate space (6) and, in the third intermediate space (35) at a lower external temperature.

2. The device according to claim 1, in which the first intermediate space (5) is divided by a plurality of webs (15) extending horizontally in the longitudinal direction, their width (B) being at least four times larger than the spacing (A) between adjacent webs.

3. The device according to claim 1, in which the second intermediate space (6) is narrower than the third intermediate space (35).

4. The device according to claim 1, in which the liquid circuit (9') connected to the third intermediate space (35) is guided via a building heating element (21).

5. The device according to claims 1, in which the circuit (9) connected to the second intermediate space (6) is connected to a hot-water tank (11).

6. The device according to claim 1, in which a plurality of tanks (17) each holding a different pigmented liquid are disposed in the liquid circuit (9, 9'), the tanks being selectively connected to the circuit lines (9, 9') by way of valves.

7. The device according to claims 1, in which separate pigmentation devices in the circuits (9, 9) are switched to the second and third intermediate spaces (6, 35).

8. The device according to claim 1, in which tensile connections (13, 16, 36) connect two outermost plates (2, 34) to plates (3, 4) located adjacent to the two outermost plates.

* * * * *